US009936071B1

United States Patent
Kothuvatiparambil et al.

(10) Patent No.: US 9,936,071 B1
(45) Date of Patent: Apr. 3, 2018

(54) AUTOMATED RESPONSE TOOL (71) Applicant: Bank of America Corporation, Charlotte, NC (US)

(72) Inventors: Viju S. Kothuvatiparambil, Plano, TX (US); Priyank R. Shah, Seattle, WA (US); Emad Noorizadeh, Fairview, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/367,714

(22) Filed: Dec. 2, 2016

(51) Int. Cl.
  *H04M 11/00* (2006.01)
  *H04M 3/493* (2006.01)
  *G10L 15/18* (2013.01)
  *G10L 15/22* (2006.01)

(52) U.S. Cl.
  CPC ....... *H04M 3/4936* (2013.01); *G10L 15/1822* (2013.01); *G10L 15/22* (2013.01); *G10L 2015/223* (2013.01)

(58) Field of Classification Search
  CPC .......... H04M 3/4936; H04M 15/1822; H04M 15/22; G10L 15/1822; G10L 15/22
  See application file for complete search history.

(56) References Cited

U.S. PATENT DOCUMENTS

2013/0219333 A1* 8/2013 Palwe ............... H04M 1/72522
 715/810
2017/0140285 A1* 5/2017 Dotan-Cohen ........ G06N 5/048

\* cited by examiner

*Primary Examiner* — Simon King
(74) *Attorney, Agent, or Firm* — Michael A. Springs (57) ABSTRACT

An automated response tool includes a receiver, a language processor, and a service invoker. The receiver receives a call and a spoken statement from the received call. The language processor detects a plurality of words in the spoken statement and generates a parse tree based on the detected plurality of words. The language processor also determines, based on the parse tree, a service to invoke in response to the spoken statement, determines a parameter used during execution of the determined service, and determines, based on the parse tree, a value of the determined parameter. The service invoker issues a command to invoke the determined service, wherein the command comprises the determined value of the determined parameter.

12 Claims, 5 Drawing Sheets

AUTOMATED RESPONSE TOOL

TECHNICAL FIELD

This disclosure relates generally to automated call response systems.

BACKGROUND

An organization may use an automated call response system to handle external telephone calls to the organization. When a telephone call is received, the automated system may provide the caller a series of prompts and/or questions to determine how to direct and/or handle the call.

SUMMARY OF THE DISCLOSURE

According to an embodiment, an automated response tool includes a receiver, a language processor, and a service invoker. The receiver receives a call and a spoken statement from the received call. The language processor detects a plurality of words in the spoken statement and generates a parse tree based on the detected plurality of words. The language processor also determines, based on the parse tree, a service to invoke in response to the spoken statement, determines a parameter used during execution of the determined service, and determines, based on the parse tree, a value of the determined parameter. The service invoker issues a command to invoke the determined service, wherein the command comprises the determined value of the determined parameter.

According to another embodiment, a method includes receiving a call and a spoken statement from the received call and detecting a plurality of words in the spoken statement. The method also includes generating a parse tree based on the detected plurality of words and determining, based on the parse tree, a service to invoke in response to the spoken statement. The method further includes determining a parameter used during execution of the determined service, determining, based on the parse tree, a value of the determined parameter, and issuing a command to invoke the determined service, wherein the command comprises the determined value of the determined parameter.

According to yet another embodiment, a system includes a device and an automated response tool. The device initiates a call comprising a spoken statement. The automated response tool receives the call and the spoken statement and detects a plurality of words in the spoken statement. The automated response tool also generates a parse tree based on the detected plurality of words and determines, based on the parse tree, a service to invoke in response to the spoken statement. The automated response tool further determines a parameter used during execution of the determined service, determines, based on the parse tree, a value of the determined parameter, and issues a command to invoke the determined service, wherein the command comprises the determined value of the determined parameter.

Certain embodiments provide one or more technical advantages. For example, an embodiment reduces the number of prompts and/or questions presented to a caller before responding to the caller. As another example, an embodiment improves the speed at which a call is responded to. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

An organization may use an automated call response system to handle external telephone calls to the organization. When a telephone call is received, the automated system may provide the caller a series of prompts and/or questions to determine how to direct and/or handle the call. For example, the automated system may respond to the caller in this manner:

System: Hello, how may I help you?
Caller: Hi, I would like to pay my June Internet bill.
System: You want to pay a bill. Is that correct?
Caller: Yes.
System: What type of bill do you want to pay?
Caller: My June Internet bill.
System: You want to pay your Internet bill. Is that correct?
Caller: Yes.
System: Which Internet bill would you like to pay?
Caller: My June Internet bill.
System: Hold on while I pull up the information for your June Internet bill.

As seen in the last example, existing call response systems use multiple prompts and/or questions to determine how to direct and/or handle the call. As a result, the caller is often forced to answer multiple, repetitive questions. This degrades the user experience and lengthens the telephone call which increases the computing strain on the organization's systems.

This disclosure contemplates an automated call response system that processes the entirety of a user's spoken statement to determine the intent of the caller and any parameters provided by the caller. The automated response system then invokes an appropriate service to respond to the caller. As a result, the automated response system reduces the number of questions and/or prompts that the caller answers in certain embodiments. Additionally, the automated response system conserves computing resources in handling and/or directing telephone calls in particular embodiments. For example, the automated call response system may provide for the following call:

System: Hello, how may I help you?
Caller: Hi, I would like to pay my June Internet bill.
System: Great. Hold on while I pull up the information for your June Internet bill.

Figure 1:
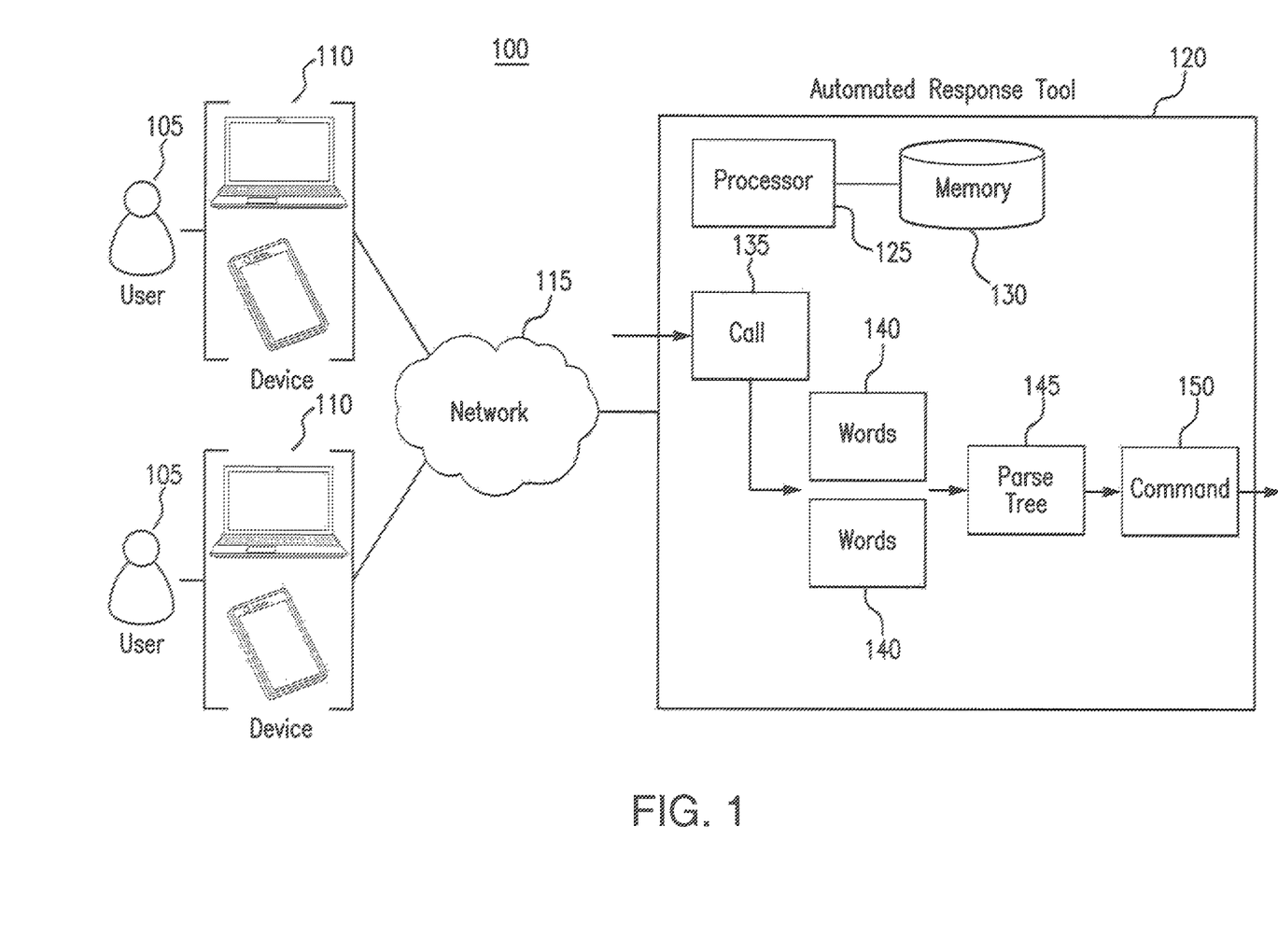
FIG. 1 illustrates a system for responding to a call.

The automated response system will be described using FIGS. 1 through 5. FIG. 1 will describe the automated response system generally. FIGS. 2 through 5 will describe the automated response system in more detail.

FIG. 1 illustrates a system 100 for responding to a call. As shown in FIG. 1, system 100 includes one or more devices 110, a network 115 and an automated response tool 120. In particular embodiments, system 100 reduces the number of prompts and/or questions that a caller answers before system 100 determines how to direct and/or handle a call.

Devices 110 may be any appropriate device for communicating with automated response tool 120 over network 115. For example, devices 110 may be a telephone, a mobile phone, a computer, a laptop, a tablet and/or an automated assistant. Devices 110 may initiate telephone calls over network 115 to automated response tool 120. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Automated response tool 120 receives telephone calls from devices 110 over network 115 and determines how to handle and/or direct the call. As illustrated in FIG. 1, automated response tool 120 includes a processor 125 and a memory 130. This disclosure contemplates processor 125 and memory 130 being configured to perform any of the functions of automated response tool 120 described herein. In particular embodiments, automated response tool 120 reduces the number of questions and/or prompts that a caller answers before automated response tool 120 directs and/or handles the caller's call.

Processor 125 is any electronic circuitry, including, but not limited to microprocessors, application specific integrated circuits (ASIC), application specific instruction set processor (ASIP), and/or state machines, that communicatively couples to memory 140 and controls the operation of automated response tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of automated response tool 120 by processing information received from network 115, device(s) 110, and memory 130. Processor 125 may be a programmable logic device, a microcontroller, a microprocessor, any suitable processing device, or any suitable combination of the preceding, Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Automated response tool 120 receives a call 135 over network 115. Call 135 may be a telephone call initiated by a user 105 using device 110. Call 135 may include one or more spoken statements by user 105. Automated response tool 120 may process the spoken statements in call 135 to determine a service to invoke to respond to call 135. For example, if user 105 made call 135 to pay a bill, then automated response tool 120 may invoke a bill pay service to respond to user 105. The bill pay service may include connecting user 105 with a representative who can assist in getting the bill paid.

Automated response tool 120 may parse the spoken statements in call 135 to detect one or more words 140 that make up the spoken statements in call 135. Automated response tool 120 may then analyze words 140 to determine the intent of the caller and to invoke a service to respond to the intent of the caller. For example, automated response tool 120 may analyze words 140 to determine that the caller wants to pay a bill. Automated response tool 120 may then invoke a bill pay service to respond to the caller.

Automated response tool 120 generates a parse tree 145 based on the detected words 140. Parse tree 145 is a data structure that allows automated response tool 120 to accurately analyze call 135. For example, parse tree 145 may indicate the various language structures, such as clauses, phrases, subjects, verbs, and objects in a spoken statement and identify the words in each language structure. Automated response tool 120 may analyze parse tree 145 to determine the intent of a caller and also to determine any parameters provided by the caller for an invoked service. Automated response tool 120 may invoke a service based on its analysis of parse tree 145. Automated response tool 120 may also supply the invoke service with any parameters detected in parse tree 145. In particular embodiments, automated response tool 120 may also ask questions of the caller to determine a service to invoke and/or any parameters needed to invoke a service.

Automated response tool 120 may generate a command 150 based on parse tree 145. Command 150 may instruct that a service be invoked to respond to the caller. Command 150 may also include any parameters provided by the caller.

In some embodiments, an implementation of automated response tool 120 may be limited to a particular context to further improve the operation of automated response tool 120. For example, if automated response tool 120 is being implemented by a supermarket, then automated response tool 120 may be limited to the context of determining store hours and/or determining store locations. Automated response tool 120 may store a dictionary and an ontology that limits the context in which automated response tool 120 is implemented. For example, the ontology may indicate that automated response tool 120 should handle only requests for store hours and requests for store locations. The dictionary may include words that relate only to requests for store locations and store hours. Automated response tool 120 may compare parse tree 145 with the stored ontology and/or dictionary and extract a concept from parse tree 145 based on that comparison. The concept may be used to determine the service that should be invoked to respond to the telephone call. For example, the concept may indicate that the caller wants to know a store location. In that instance, automated response tool 120 may respond to the caller with the requested information. By limiting the context of automated response tool 120, the accuracy of automated response tool 120 in responding to a call appropriately is improved. For example, by limiting the context, automated response tool 120 may have a smaller universe of services to invoke to respond to a telephone call. As a result, automated response tool 120 may respond to the call and the caller's intent more accurately.

Figure 2:
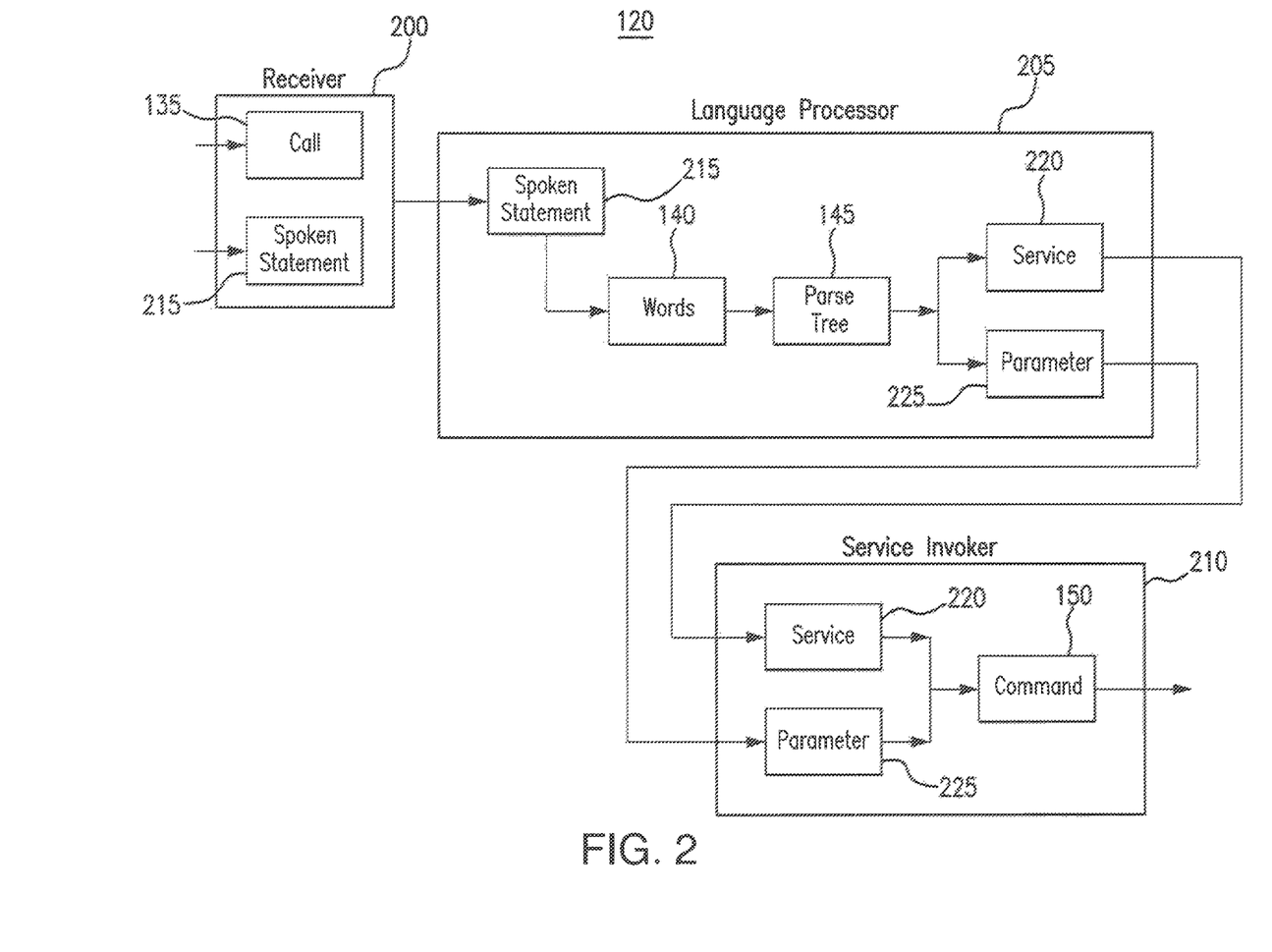
FIG. 2 illustrates the automated response tool of FIG. 1.

FIG. 2 illustrates the automated response tool 120 of FIG. 1. As illustrated in FIG. 2, automated response tool 120 includes a receiver 200, a language processor 205 and a service invoker 210. In particular embodiments, the automated response tool 120 reduces the number of questions that a caller answers before automated response tool 120 directs and/or handles the caller's call.

Receiver 200 receives a call 135, such as a telephone call for example, and a spoken statement 215 spoken within call 135. For example, receiver 200 may be a telephone receiver and receiver 200 may receiver a telephone call 135 from a caller. The caller may make spoken statement 215 during call 135. As an example, the caller may say I want to pay my June Internet bill. Receiver 200 may receive the spoken statement I want to pay my June internet bill and forward the spoken statement 215 to language processor 205. An example algorithm for receiver 200 is as follows: wait for call 135; receive call 135; pick up call 135; receive spoken statement 215; and forward spoken statement 215 to language processor 205.

Language processor 205 receives spoken statement 215 and processes spoken statement 215 to determine an appropriate service 220 to invoke to respond to call 135 and any parameters 225 needed to invoke service 220. Language processor 205 may detect a plurality of words 140 in spoken statement 215. Using the previous example, words 140 include: pay, June, internet, and bill. Language processor 205 may process the detected words 140 to determine the service 220 to invoke to respond to call 135.

Language processor 205 may generate a parse tree 145 based on the detected words 140. Parse tree 145 may indicate the language structure of spoken statement 215. Using the previous example, parse tree 145 may indicate a verb and infinitive combination of "want" and "to pay" and an object of "bill" with the modifiers of "June" and "internet." Language processor 205 may analyze parse tree 145 to determine the intent of the caller. For example, based on the example parse tree 145, language processor 205 may determine that the caller wants to pay a bill. In response, language processor 205 may invoke a bill pay service 220.

Language processor 205 may also determine from parse tree 145 that "bill" is modified by "June" and "internet." Language processor 205 may extract "June" and "internet" as values for parameters 225 (e.g. date and type parameters) to the bill pay service 220. The values of the parameters 225 may be "June" and "internet." Language processor 205 may then forward the determined service 220 and the values of the parameters 225 to service invoker 210.

An example algorithm for language processor 205 is as follows: wait for spoken statement 215; receive spoken statement 215 from receiver 200; parse spoken statement 215 to detect one or more words 140; generate parse tree 145 using words 140; detect an intent of the caller by analyzing parse tree 145; use the detected intent to determine a service to invoke; extract values for parameters from parse tree 145; and forward service 220 and the values of parameters 225 to service invoker 210.

Service invoker 210 receives service 220 in parameters 225 from language processor 205. Service invoker 210 may analyze service 220 and the values of parameters 225 to generate a command 150. Command 150 may then be sent to instruct that service 220 be invoked using the values of parameters 225. An example algorithm for service invoker 210 is as follows: wait for service 220; receive service 220 from language processor 205; receive the values of parameters 225 from language processor 205; generate a command 150 to invoke the received service 220 using the values of parameters 225; and communicate command 150 to invoke service 220.

In particular embodiments, language processor 205 and service invoker 210 allow a service 220 to be determined and invoked without presenting a caller with multiple prompts and/or questions. As seen in the previous example, the caller is directed to a bill pay service using only the spoken statement "I want to pay my June internet bill." The language processor 205 and service invoker 210 did not need additional questions to be asked of the caller in order to determine that the caller wanted to pay the June internet bill.

In particular embodiments, automated response tool 120 also includes a transmitter that transmits audible signals, such as questions, requests and confirmations, back to the caller. For example, if language processor 205 determines that there is not enough information in spoken statement 215 to determine what service 220 should be invoked, then the transmitter may communicate an audible question back to the caller for the caller to answer. The answer may be communicated as another spoken statement 215 that language processor 205 can process to determine which service 220 should be invoked. As another example, the transmitter may communicate an audible request back to the caller. If language processor 205 determines that certain parameters 225 are needed to invoke a determined service 220 but that the caller has not provided the values of these parameters 225. For example, if the caller had initially stated "I want to pay my bill," language processor 205 may determine that certain values for parameter 225 are missing. In response, the transmitter may communicate the audible request "do you want to pay your telephone, internet or television bill?" As yet another example, the transmitter may communicate an audible confirmation that the determined service 220 has been invoked. Using the previous example, the transmitter may communicate an audible confirmation stating "Great, let me forward you to the internet bill pay service." In this manner, automated response tool 120 may dynamically interact with the caller to determine the appropriate service 220 to invoke to respond to the caller.

Figure 3:
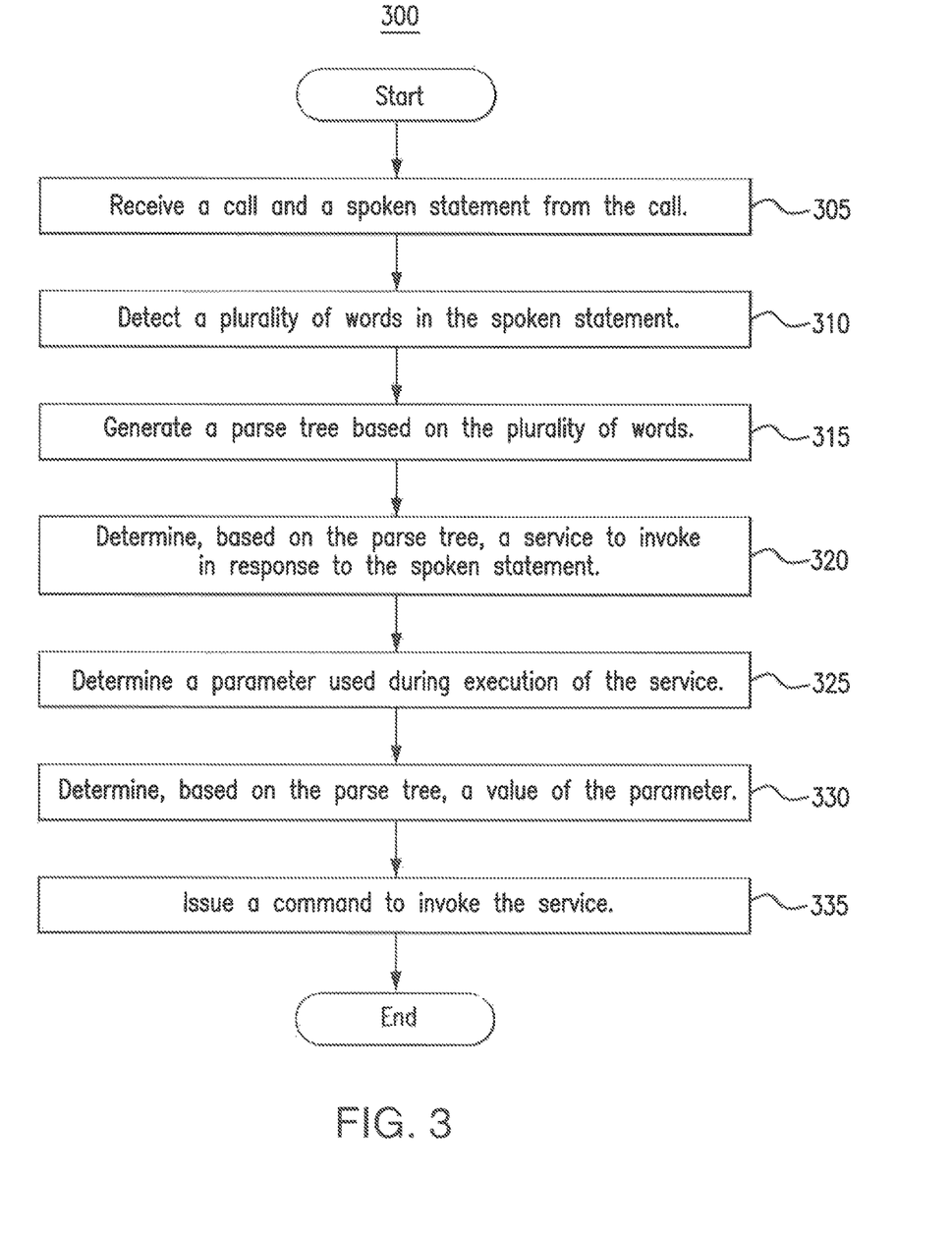
FIG. 3 is a flowchart illustrating a method for responding to a call using the system of FIG. 1.

FIG. 3 is a flowchart illustrating a method 300 for responding to a call using the system 100 of FIG. 1. In particular embodiments, automated response tool 120 may perform method 300. By performing method 300, automated response tool 120 may reduce the number of questions that a caller answers before automated response tool 120 is able to determine a service to invoke to respond to the caller.

Automated response tool 120 receives a call and a spoken statement from the call in step 305. In step 310, automated response tool 120 detects a plurality of words in the spoken statement. Automated response tool 120 then generates a parse tree 145 based on the plurality of words in step 315. In step 320, automated response tool 120 determines based on the parse tree 145 a service to invoke in response to the spoken statement. Automated response tool 120 then determines a parameter used during execution of the service in step 325. In step 330, automated response tool 120 determines based on the parse tree 145 a value of the parameter. Then automated response tool 120 issues a command to invoke the service in step 335.

Figure 4:
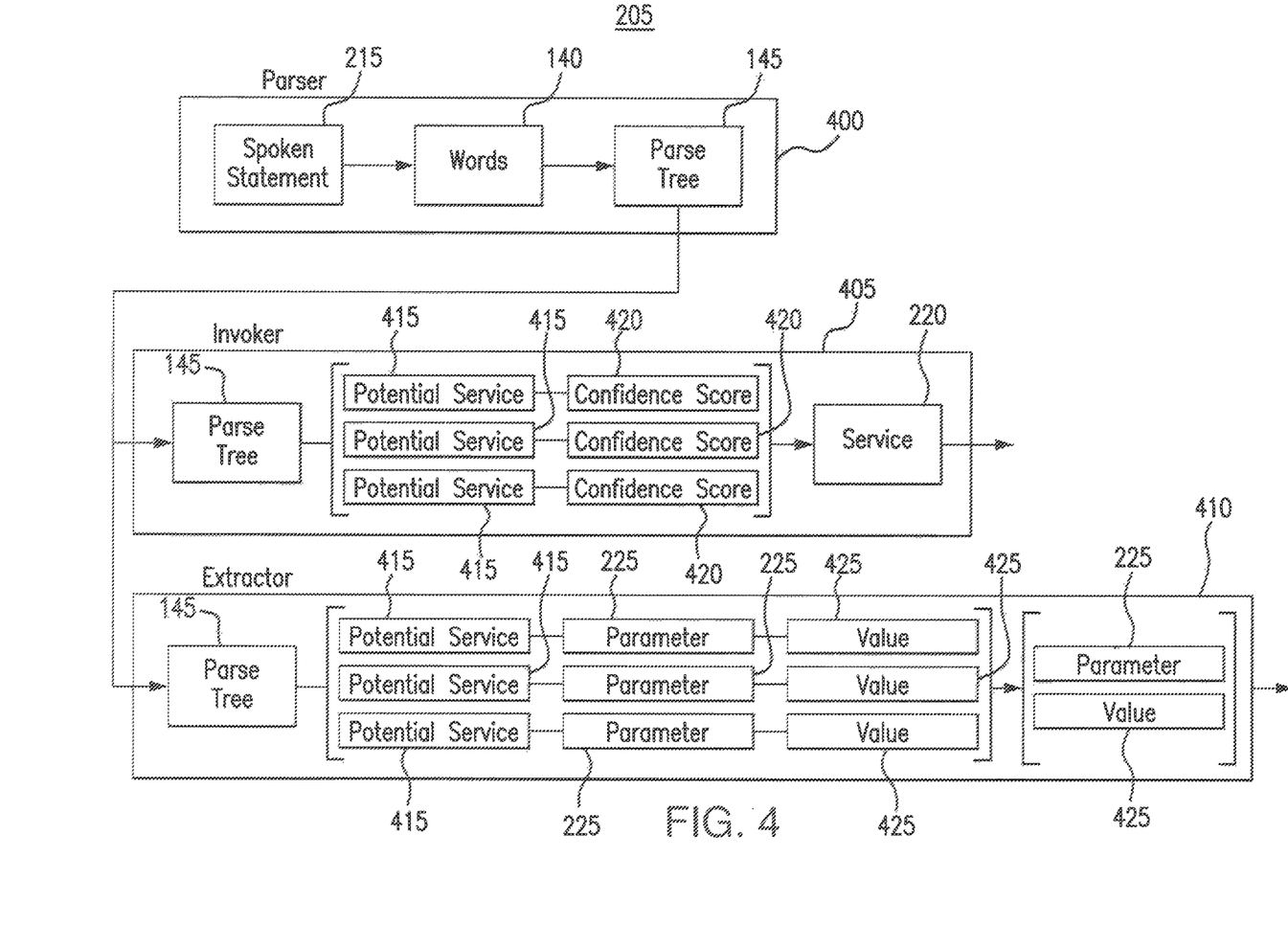
FIG. 4 illustrates language processor of FIG. 2.

FIG. 4 illustrates language processor 205 of FIG. 2. As illustrated in FIG. 4, language processor 205 includes a parser 400, an invoker 405 and an extractor 410. In particular embodiments, language processor 205 analyzes a spoken statement 215 to determine a service 220 to invoke to respond to spoken statement 215.

Parser 400 is configured to generate a parse tree 145 from spoken statement 215. Parser 400 receives spoken statement 215 from a call. Spoken statement 215 may be made by a caller that initiated the call. Parser 40 analyzes spoken statement 215 to determine one or more words 140 that make up spoken statement 215. Words 140 may indicate a request made by a caller who made spoken statement 215. Parser 400 may then generate a parse tree 145 using words 140. Parse tree 145 may indicate the structure and the ordering of words 140 in spoken statement 215, Parser 400 may then forward parse tree 145 to invoker 405 and extractor 410. An example algorithm for parser 400 is as follows: wait fix spoken statement 215; receive spoken statement 215; parse spoken statement 215 to detect one or more words 140 in spoken statement 215; generate parse tree 145 using words 140; and forward parse tree 145 to invoker 405 and extractor 410.

Invoker 405 receive parse tree 145 and analyzes parse tree 145 to determine a service 220 to invoke to respond to spoken statement 215. Invoker 405 may analyze parse tree 145 to determine one or more potential services 415 to be invoked to respond to spoken statement 215. In some embodiments, the one or more potential services 415 may be all the services that can be invoked by automated response tool 120. Invoker 405 analyzes parse tree 145 to determine a confidence score 420 for each potential service 415. Confidence score 420 represents the likelihood that the corresponding potential service 415 is the service to be invoked to respond to spoken statement 215. Invoker 405 may compare the confidence scores 420 of each potential service 415 to determine which potential service 415 to invoke. For example, invoker 405 may invoke the potential service 415 with the highest confidence score 420.

Invoker 405 may determine confidence scores 420 based on the words and the structure of the words indicated by parse tree 145. For example, if parse tree 145 includes the words "pay" and "bill," then a bill pay service may be assigned a high confidence score. As another example, if parse tree 145 includes the words "cancel" and "service,"

then the bill pay service may not be assigned a high confidence score. Invoker 405 may employ machine learning processes to learn which words in parse tree 145 and which structures in parse tree 145 correspond with which potential service 415. As a result, invoker 405 may be trained to accurately assign confidence scores to potential services 415. After determining service 220, invoker 405 may communicate service 220 to be invoked. An example algorithm for invoker 405 is as follows: wait for parse tree 145; receive parse tree 145; compare the words and structures in parse tree 145 with learned algorithms to determine confidence scores 420 for each potential service 415 of a plurality of potential services 415; compare the determined confidence scores and select the potential service 415 with the highest confidence score 420; and communicate the selected service for invocation.

In particular embodiments, calculating the confidence score 420 for each potential service may include determining a distance between nodes. For example, the words indicated by parse tree 145 may be mapped to a node. Each potential service 415 may also be mapped to a second node. The confidence score 420 for that potential service 415 may be based on the distance between the node for parse tree 145 and the node for that potential service 415. The greater the distance, the lower the confidence score 420 may be. In some embodiments, calculating confidence scores 420 for each potential service 415 may include comparing parse tree 145 with a parse tree corresponding to potential service 415. For example, the words and the structures of these parse trees may be compared to determine confidence score 420. For example, the more similar the parse trees are to each other the higher confidence score 420 may be. In certain embodiments, invoker 405 may calculate confidence scores 420 by sending parse tree 145 through a search engine. The search engine may use parse tree 145 to search for one or more potential services 415 to be invoked to respond to spoken statement 215. The search engine may assign confidence score 420 based on the relevance of a search result. For example, the more relevant a search result is the higher the confidence score 420.

Extractor 410 may analyze parse tree 145 to determine a parameter 225 and a value 425 for that parameter 225. Parameter 225 may be used in the invocation of service 220. Extractor 410 receives the list of potential services 415 and determines a set of parameters 225 for each potential service 415. The parameters 225 may be needed to invoke a potential service 415. For example, a bill pay service may need parameters corresponding to bill type and date of bill. As another example, a service to check a balance may need the parameter of account type.

Extractor 410 may analyze parse tree 145 to determine if a caller has provided a value 425 for parameter 225. Extractor 410 may identify certain words in parse tree 145 that may be values 425 for parameters 225. For example, extractor 410 may analyze parse tree 145 to determine if a caller has provided a bill type, account type and/or date. Extractor 410 may then store these values 425 corresponding to parameters 225.

In certain embodiments, invoker 405 may update confidence score 420 for a potential service 415 based on whether a value 425 has been provided for a parameter 225 for that potential service 415. For example, if extractor 410 determines that a value 425 was provided for a potential service 415, then invoker 405 may increase the confidence score 420 for that potential service 415. As another example, if extractor 410 determines that a value 425 was not provided for a potential service 415, then invoker 405 may lower the confidence score 420 for that potential service 415.

Extractor 410 may forward one or more of parameter 225 and value 425 for a determined service 220 so that the service 220 may be invoked using the value 425. In certain embodiments, if invoker 405 determines that a service 220 should be invoked by extractor 410 determines that a value 425 has not been provided, then automated response tool 120 may transmit or communicate a question back to the caller to provide value 425. For example, if a caller requests to pay a bill and says nothing further, then extractor 410 may determine that value 425 has been provided for bill type and/or date. In response, automated response tool 120 may ask the caller to provide a type of bill and the date of the bill. Once the caller has provided that information, then automated response tool 120 may invoke the bill pay service using the provided bill type and date.

In certain embodiments, invoker 405 may eliminate a potential service 415 from consideration based on whether extractor 410 determines that values 425 have not been provided for that potential service 415. For example, if a confidence score 420 for a potential service 415 is below a particular threshold and a value 425 has not been provided for a necessary parameter 225 of that potential service 415, then invoker 405 may eliminate that potential service 415 from consideration.

An example algorithm for extractor 410 is as follows: wait for parse tree 145; receive parse tree 145; wait for potential services 415; receive potential services 415; determine a parameter 225 for each potential service 415; analyze the words and structure of parse tree 145 to determine a value 425 for each parameter 225; wait for invoked service 220; receive invoked service 220; determine parameter 225 and value 425 for invoked service 220; and communicate parameter 225 and value 425 for invocation of service 220.

Figure 5:
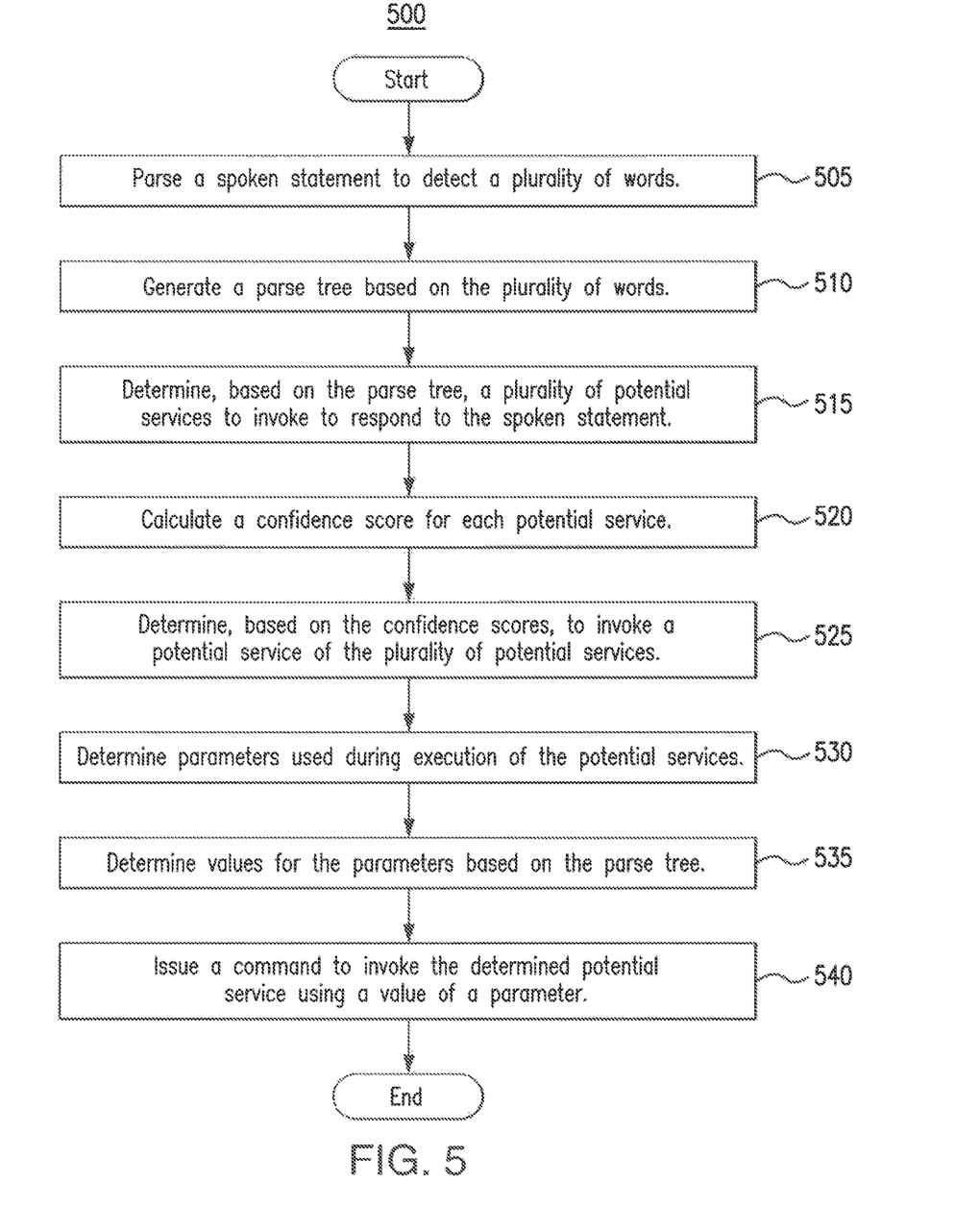
FIG. 5 is a flowchart illustrating a method of responding to a call using the system of FIGS. 1 and/or 2.

FIG. 5 is a flowchart illustrating a method 500 of responding to a. call using the system 100 of FIGS. 1 and/or 2. In particular embodiments, automated response tool 120 and/or language processor 205 may perform method 500. By performing method 500 the number of questions that a caller needs to respond to may be reduced.

In step 505, language processor 205 may parse a spoken statement to detect a plurality of words. Language processor 205 may generate a parse tree 145 based on the plurality of words in step 510. In step 515, language processor 205 determines based on the parse tree 145 a plurality of potential services to invoke to respond to the spoken statement. Language processor 205 may then calculate a confidence score for each potential service in step 520. In step 525, language processor 205 determines, based on the confidence scores, to invoke a potential service of the plurality of potential services. Language processor 205 then determines parameters used during execution of the potential services in step 530. In step 535, language processor 205 determines values for the parameters based on the parse tree 145. Then language processor 205 issues a command to invoke the determined potential service using a value of a parameter in step 540.

Modifications, additions, or omissions may be made to methods 300 and 500 depicted in FIGS. 3 and 5. Methods 300 and 500 may include more, fewer, or other steps. For example, steps may be performed in parallel or in any suitable order. While discussed as automated response tool 120 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An automated response tool comprising:
a receiver configured to receive a call and a spoken statement from the received call;
a language processor configured to:
detect a plurality of words in the spoken statement;
generate a parse tree based on the detected plurality of words;
determine, based on the parse tree, a plurality of services to invoke in response to the spoken statement;
calculate a confidence score for each service of the determined plurality of services based on the parse tree by determining a shortest distance between a first node and a second node for each potential service, the first node representing the plurality of words, the second node representing that potential service, each confidence score indicating a likelihood that a potential service is a service requested by the spoken statement;
determine, for each service of the plurality of services, a parameter used during execution of that service;
determine, for each determined parameter for each service of the plurality of services, based on the parse tree, whether the spoken statement comprises a value for that determined parameter;
eliminate a service of the plurality of services in response to a determination that the spoken statement does not comprise a value for the determined parameter of the eliminated service;
determine, based on the parse tree, to invoke a service of the plurality of services with the highest confidence score based on the shortest distance in response to the spoken statement;
determine a parameter used during execution of the determined service; and
determine, based on the parse tree, a value of the determined parameter;
a service invoker configured to issue a command to invoke a service of the plurality of services with the highest confidence score based on the shortest distance, wherein the command comprises the determined value of the determined parameter; and
a transmitter configured to communicate an audible question in response to a determination that two or more services of the plurality of services have equivalent confidence scores.

2. The automated response tool of claim 1, wherein the language processor is further configured to:
compare the parse tree to a stored ontology and a stored dictionary; and
extract a concept from the parse tree based on the comparison.

3. The automated response tool of claim 1, further comprising a transmitter configured to communicate an audible request for a value of a determined parameter.

4. The automated response tool of claim 1, further comprising a transmitter configured to communicate an audible confirmation that the determined service has been invoked.

5. A method comprising:
receiving a call and a spoken statement from the received call;
detecting a plurality of words in the spoken statement;
generating a parse tree based on the detected plurality of words;
determining, based on the parse tree, a plurality of services to invoke in response to the spoken statement;
calculating a confidence score for each service of the determined plurality of services based on the parse tree by determining a shortest distance between a first node and a second node for each potential service, the first node representing the plurality of words, the second node representing that potential service, each confidence score indicating a likelihood that a potential service is a service requested by the spoken statement;
determining, for each service of the plurality of services, a parameter used during execution of that service;
determining, for each determined parameter for each service of the plurality of services, based on the parse tree, whether the spoken statement comprises a value for that determined parameter;
eliminating a service of the plurality of services in response to a determination that the spoken statement does not comprise a value for the determined parameter of the eliminated service;
determining, based on the parse tree, to invoke a service of the plurality of services with the highest confidence score based on the shortest distance in response to the spoken statement;
determining a parameter used during execution of the determined service;
determining, based on the parse tree, a value of the determined parameter;
issuing a command to invoke a service of the plurality of services with the highest confidence score based on the shortest distance, wherein the command comprises the determined value of the determined parameter; and
communicating an audible question in response to a determination that two or more services of the plurality of services have equivalent confidence scores.

6. The method of claim 5, further comprising:
comparing the parse tree to a stored ontology and a stored dictionary; and
extracting a concept from the parse tree based on the comparison.

7. The method of claim 5, further comprising communicating an audible request for a value of a determined parameter.

8. The method of claim 5, further comprising communicating an audible confirmation that the determined service has been invoked.

9. A system comprising:
a device configured to initiate a call comprising a spoken statement; and
an automated response tool configured to:
 receive the call and the spoken statement;
 detect a plurality of words in the spoken statement;
 generate a parse tree based on the detected plurality of words;
 determine, based on the parse tree, a plurality of services to invoke in response to the spoken statement;
 calculate a confidence score for each service of the determined plurality of services based on the parse tree by determining a shortest distance between a first node and a second node for each potential service, the first node representing the plurality of words, the second node representing that potential service, each confidence score indicating a likelihood that a potential service is a service requested by the spoken statement;
 determine, for each service of the plurality of services, a parameter used during execution of that service;
 determine, for each determined parameter for each service of the plurality of services, based on the parse tree, whether the spoken statement comprises a value for that determined parameter;
 eliminate a service of the plurality of services in response to a determination that the spoken statement does not comprise a value for the determined parameter of the eliminated service;
 determine, based on the parse tree, to invoke a service of the plurality of services with the highest confidence score based on the shortest distance in response to the spoken statement;
 determine a parameter used during execution of the determined service;
 determine, based on the parse tree, a value of the determined parameter; and
 issue a command to invoke a service of the plurality of services with the highest confidence score based on the shortest distance, wherein the command comprises the determined value of the determined parameter; and
 communicate an audible question in response to a determination that two or more services of the plurality of services have equivalent confidence scores.

10. The system of claim 9, wherein the automated response tool is further configured to:
compare the parse tree to a stored ontology and a stored dictionary; and
extract a concept from the parse tree based on the comparison.

11. The system of claim 9, wherein the automated response tool is further configured to communicate an audible request for a value of a determined parameter.

12. The system of claim 9, wherein the automated response tool is further configured to communicate an audible confirmation that the determined service has been invoked.

* * * * *